(12) United States Patent
Hwang et al.

(10) Patent No.: US 9,180,421 B2
(45) Date of Patent: Nov. 10, 2015

(54) MICRO-CHANNEL WATER-GAS SHIFT REACTION DEVICE HAVING BUILT-IN FLOW-THROUGH-TYPE METAL CATALYST

(75) Inventors: Kyung-Ran Hwang, Daejeon (KR); Jong-Soo Park, Daejeon (KR); Shin-Kun Ryi, Daejeon (KR); Jin-Suk Lee, Daejeon (KR); Chun-Boo Lee, Daejeon (KR); Sung-Wook Lee, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 14/237,756

(22) PCT Filed: Aug. 8, 2012

(86) PCT No.: PCT/KR2012/006297
§ 371 (c)(1),
(2), (4) Date: Feb. 7, 2014

(87) PCT Pub. No.: WO2013/022271
PCT Pub. Date: Feb. 14, 2013

(65) Prior Publication Data
US 2014/0178259 A1 Jun. 26, 2014

(30) Foreign Application Priority Data
Aug. 11, 2011 (KR) .................. 10-2011-0080183

(51) Int. Cl.
*B01J 8/02* (2006.01)
*B01J 16/00* (2006.01)
(Continued)

(52) U.S. Cl.
CPC ............ *B01J 16/005* (2013.01); *B01J 19/0093* (2013.01); *C01B 3/16* (2013.01);
(Continued)

(58) Field of Classification Search
CPC ............. B01J 16/005; B01J 16/00; B01J 8/02
USPC .......................................... 422/162, 600, 603
See application file for complete search history.

(56) References Cited

U.S. PATENT DOCUMENTS 5,015,444 A * 5/1991 Koga et al. .................... 422/625
5,271,916 A 12/1993 Vanderborgh et al.
(Continued)

FOREIGN PATENT DOCUMENTS

| CN | 1187840 A | 7/1998 |
|---|---|---|
| EP | 1161991 A1 | 12/2001 |

(Continued)

OTHER PUBLICATIONS

Office Action directed to related Chinese Patent Application No. 201280039029, mailed Dec. 31, 2014; 7 pages.
(Continued)

*Primary Examiner* — Walter D Griffin
*Assistant Examiner* — Huy-Tram Nguyen
(74) *Attorney, Agent, or Firm* — Sterne, Kessler, Goldstein & Fox P.L.L.C.

(57) ABSTRACT

The present invention relates to a micro-channel water-gas shift (WGS) reaction device for WGS for generating hydrogen and pre-combustion carbon capture and storage (CCS) from coal gasification, the device using a micro-channel heat exchanger and through-type metal catalyst capable of rapidly dissipating heat generated during single-stage WGS reaction of high concentration CO in a high temperature space.

8 Claims, 14 Drawing Sheets

(51) Int. Cl.
*C01B 3/16* (2006.01)
*B01J 19/00* (2006.01)
*C10K 3/04* (2006.01)
*C10K 1/00* (2006.01)

(52) U.S. Cl.
CPC ......... *C10K 3/04* (2013.01); *B01J 2219/00783* (2013.01); *B01J 2219/00808* (2013.01); *B01J 2219/00835* (2013.01); *B01J 2219/00873* (2013.01); *C01B 2203/0288* (2013.01); *C01B 2203/04* (2013.01); *C01B 2203/0405* (2013.01); *C01B 2203/0475* (2013.01); *C01B 2203/0485* (2013.01); *C01B 2203/146* (2013.01); *C10J 2300/093* (2013.01); *C10K 1/004* (2013.01); *C10K 1/005* (2013.01)

(56) References Cited

U.S. PATENT DOCUMENTS

| | | | |
|---|---|---|---|
| 5,534,328 A * | 7/1996 | Ashmead et al. | 428/166 |
| 6,007,700 A | 12/1999 | Alario et al. | |
| 7,927,750 B2 | 4/2011 | Park et al. | |
| 2006/0036106 A1 * | 2/2006 | Mazanec et al. | 549/533 |

FOREIGN PATENT DOCUMENTS

| KR | 10-2006-0031935 A | 4/2006 |
|---|---|---|
| KR | 10-0719486 B1 | 5/2007 |
| KR | 10-2009-0062067 A | 6/2009 |
| KR | 10-2009-0067894 A | 6/2009 |
| KR | 10-2011-0067481 A | 6/2011 |
| KR | 10-1072835 B1 | 10/2011 |
| KR | 10-1136859 B1 | 4/2012 |
| KR | 10-1136867 B1 | 4/2012 |
| KR | 10-1191881 B1 | 10/2012 |

OTHER PUBLICATIONS

Search Report directed to related Chinese Patent Application No. 201280039029, mailed Dec. 3, 2014; 1 page.
International Search Report directed to related International Patent Application No. PCT/KR2012/006297, mailed Feb. 18, 2013; 4 pages.
English-language abstract for Korean Patent Publication No. 10-0719486 B1; 2 pages, Jun. 16, 2015
English-language abstract for Korean Patent Publication No. 10-2009-0062067 A; 1 page, Jun. 16, 2015.
English-language abstract for Korean Patent Publication No. 10-2009-0067894 A; 1 page, Jun. 16, 2015.
English-language abstract for Korean Patent Publication Nos. 10-2011-0067481 A and 10-1136867 B1; 1 page, Jun. 16, 2015.
English-language abstract for Korean Patent Publication No. 10-1072835 B1; 5 pages, Jun. 16, 2015.
English-language abstract for Korean Patent Publication No. 10-1136859 B1; 1 page, Jun. 16, 2015.
English-language abstract for Korean Patent Publication No. 10-1191881 B1; 5 pages.

* cited by examiner

MICRO-CHANNEL WATER-GAS SHIFT REACTION DEVICE HAVING BUILT-IN FLOW-THROUGH-TYPE METAL CATALYST

TECHNICAL FIELD

The present invention relates to a micro-channel WGS reaction device including a through-type metal catalyst embedded therein. More specifically, the present invention relates to a micro-channel WGS reaction device using a through-type metal catalyst and a feed-through metal catalyst, whereby it is possible to rapidly remove the heat generated while high-concentration CO is processed in a single-stage WGS reaction device in a high-temperature section in the water-gas shift (WGS) reaction for before-combustion carbon capture and storage (CCS) and hydrogen production from coal gasification.

BACKGROUND ART

Various technical portfolios are applied to reduce greenhouse gas for prevention of global warming, but recently a CCS (carbon capture and storage) technology for capturing and storing $CO_2$ is coming to the fore as a controllable large-volume greenhouse gas processing technology. The capture technology applied to the power plant as a technology, whereby $CO_2$ is transported to a reservoir and stored to be isolated after it is captured from a large-volume carbon dioxide discharge source, can be classified largely into after-combustion $CO_2$ capture, before-combustion $CO_2$ capture and oxygen combustion $CO_2$ capture technologies. Of these, the before-combustion $CO_2$ capture technology is a technology, in which various fossil fuels are partially oxidized to manufacture synthetic gas ($H_2$+CO) as shown in FIG. 1 and subsequently it is converted to hydrogen and carbon dioxide through water gas transition reaction and then hydrogen or carbon dioxide is separated, so that carbon dioxide is captured before it is discharged as a flue gas. This technology is a technology for not only capturing carbon dioxide but also producing hydrogen, and is assessed as a core technology for moving to a future hydrogen economy society. Because, not petroleum, but coal, biomass and organic waste can be used as a raw material, it is a future development technology in preparation for petroleum depletion and high oil prices. Factorial technology for development of before-combustion capture technology can be divided largely into a refinement field for removing impurities after gasification, a water gas transition and reaction field for converting synthetic gas into hydrogen and carbon dioxide, and a $H_2/CO_2$ separation field for separating the generated hydrogen and $CO_2$ from each other.

Thus, water-gas shift (WGS) is indispensable for before-combustion carbon dioxide capture (CCS) from coal gasification and hydrogen production. Such WGS reaction is an exothermic reaction as shown in Reaction Formula 1, and generally goes through double-stage reaction of high temperatures (400 to 450° C.) and low temperatures (200 to 250° C.).

(Reaction Formula 1)

The synthetic gases generated from coal gasification include high-temperature, high-pressure and high-concentration CO. For example, synthetic gases produced from Conoco-Philips E-Gas include 37 mol % of CO at 42 atm and 927° C. In the case of high-concentration CO like this, a double-stage WGS reactor is indispensable. But since the gas condition is high-temperature and high-pressure, a heat exchanger is necessary for every stage, and since the concentration of CO participating in the reaction is high, it is very difficult to maintain the temperature inside the reactor isothermal using a huge amount of reaction heat generated during reaction.

In addition, although WGS is a reaction not affected by pressure, vaporization of water, which is important in WGS, hardly occurs in the case of high pressure. Especially if the temperature of synthetic gas is lowered by heat exchange, it is all the more so. Therefore, in order to WGS-process the synthetic gases obtained through coal gasification, it is preferable to proceed with WGS reaction in a high-temperature section as far as possible. However, because of thermodynamic equilibrium of the WGS reaction, a disadvantage that the CO conversion rate is not so high occurs at high temperatures.

Furthermore, because the synthetic gases generated from coal gasification are different in composition from the synthetic gases obtained through a conventional SR reaction (a natural gas modification reaction), the reaction heat generated through WGS is very high since a large quantity of CO should be processed. Unless the reaction heat is removed effectively, hot spots generate on the catalyst layer in the reactor. Such temperature rise becomes a problem of not only a deactivation of catalyst but also the CO conversion rate decreasing due to thermodynamic equilibrium.

DISCLOSURE

Technical Problem

In consideration of the above-mentioned circumstances, it is an object of the present invention to provide a micro-channel WGS reaction device using a through-type metal catalyst and a feed-through metal catalyst, whereby it is possible to rapidly remove the heat generated while high-concentration CO is processed in a single-stage WGS reaction device in a high-temperature section in the water-gas shift (WGS) reaction for before-combustion carbon capture and storage (CCS) and hydrogen production from coal gasification. The reaction heat generated while processing high-concentration CO can be speedily removed by applying a micro-channel reactor having a heat transfer rate far higher than a conventional ceramic catalyst and an excellent heat transfer area.

Technical Solution

In order to accomplish the foregoing objects, according to an embodiment of the present invention, there is provided a micro-channel water-gas shift (WGS) reaction device including: an upper plate including a heat transfer gas supply pipe which is connected with a heat transfer gas supply source to supply a heat transfer gas, and a product gas discharge pipe for discharging a product gas; a lower plate including a reactant gas supply pipe which is connected with a reactant gas supply source to supply a reactant gas, and a heat transfer gas discharge pipe for discharging the heat transfer gas; an upper heat transfer unit which is disposed under the upper plate and includes an upper heat transfer gas flow path which is connected with the heat transfer gas supply pipe to flow the heat transfer gas, and an upper product gas flow path which is formed in contact with the upper heat transfer gas flow path so as to allow heat transfer therebetween, and connected with the product gas discharge pipe; a lower heat transfer unit which is disposed on the lower plate and includes a lower heat transfer gas flow path which is connected with the heat transfer gas discharge pipe to flow the heat transfer gas, and a lower reactant gas flow path which is formed in contact with the lower heat transfer gas flow path so as to allow heat transfer therebetween, and connected with the product gas supply pipe; and at least one reaction units laminated between the upper heat transfer unit and the lower heat transfer unit, wherein the reaction unit, in order to be laminated in one or more layers, includes: a gas supply plate on which a gas supply channel for communicating only with the lower reactant gas flow path is installed; a metal catalyst plate which is laminated on the gas supply plate and has at least one metal catalyst mounted thereon and at least one porous metal retainer disposed under the metal catalyst; a gas transfer unit which is laminated on the metal catalyst plate to transfer the gas reacted with the metal catalyst to the upper product gas flow path; and an endothermic plate which is disposed under the gas supply plate or on upper side of the gas transfer unit and has an endothermic channel for communicating the upper heat transfer gas flow path with the lower heat transfer gas flow path, and wherein the gas supply plate, the metal catalyst plate, the gas transfer unit, and the endothermic plate include first reaction through holes communicated with the upper product gas flow path, second reaction through holes communicated with the upper heat transfer gas flow path, third reaction through holes communicated with the lower reactant gas flow path, fourth reaction through holes communicated with the lower heat transfer gas flow path, respectively.

Herein, when the metal retainer including a plurality of metal catalysts and a plurality of the metal retainer, these metal catalysts and metal retainers are laminated alternately to each other.

In addition, the upper heat transfer unit includes: at least one upper heat transfer plates which have an upper heat transfer channel communicated with the heat transfer gas supply pipe to form the upper heat transfer gas flow path; and at least one upper reaction gas plates which have an upper reaction channel communicated with the product gas discharge pipe to form the upper product gas flow path, and are alternately laminated with the upper heat transfer plates, wherein the upper heat transfer plates and the upper reaction gas plates include first upper through holes to fourth upper through holes formed at a position corresponding to the first reaction through holes to fourth reaction through holes of the reaction unit, and an upper shielding plate having the first upper through holes and second upper through holes formed therein is disposed at the lowermost side of the upper heat transfer unit.

Further, the lower heat transfer unit includes: at least one lower heat transfer plates which have a lower heat transfer channel communicated with the heat transfer gas supply pipe to form the lower heat transfer gas flow path; and at least one lower reactant gas plates which have a lower reaction channel communicated with the reactant gas supply pipe to form the lower reactant gas flow path, and are alternately laminated with the lower heat transfer plate, wherein the lower heat transfer plates and the lower reactant gas plates include first lower through holes to fourth lower through holes formed at a position corresponding to the first reaction through holes to fourth reaction through holes of the reaction unit, and a lower shielding plate having the third lower through holes and fourth lower through holes formed therein is disposed at the uppermost side of the lower heat transfer unit.

Further, the gas transfer unit includes: a gas collection plate which is disposed on the metal catalyst plate, and isolated from the first reaction through holes to fourth reaction through holes; and a gas transfer plate which is disposed on the gas collection plate, and includes a gas transfer channel communicated only with the first reaction through hole.

Further, the gas transfer unit is a collection and transfer plate which is disposed on the metal catalyst plate, and has porous collection holes isolated from the second reaction through hole to fourth reaction through holes, wherein the porous collection holes are communicated with the first reaction hole through a connecting channel.

Further, an O-ring is disposed on a lower side of the metal catalyst plate, and the metal retainer is disposed on the O-ring.

Furthermore, a cross-sectional area of the porous collection hole is formed smaller than that of the metal catalyst.

Advantageous Effects

According to the present invention, it is possible to rapidly remove the heat generated while high-concentration CO is processed in a single-stage WGS reactor in a high-temperature section in the water-gas shift (WGS) reaction for before-combustion carbon capture and storage (CCS) and hydrogen production from coal gasification.

Because the present invention can substitute the WGS reaction device that goes through double-stage processing of the related art, it is possible to provide a WGS reaction device with reduced installation space and installation costs as well as high efficiency.

DESCRIPTION OF DRAWINGS

FIG. 10 is a perspective view of an upper shielding plate of the micro-channel WSG reaction device of FIG. 2.

BEST MODE

Figure 1:
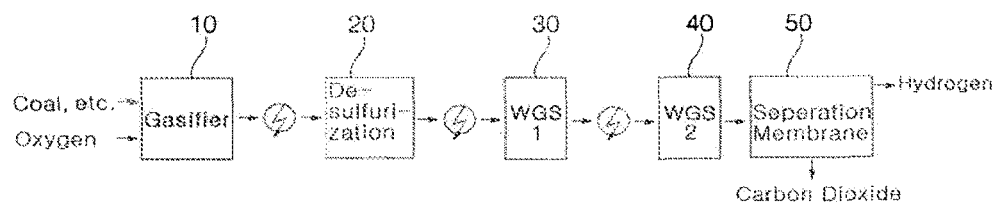
FIG. 1 is a block diagram illustrating a before-combustion $CO_2$ capture and hydrogen separation process.

Hereinafter, preferable embodiments of the present invention will be described with reference to the accompanying drawings. Referring to the drawings, like reference characters designate like or corresponding parts throughout the several views. In the embodiments of the present invention, a detailed description of publicly known functions and configurations that are judged to be able to make the purpose of the present invention unnecessarily obscure are omitted.

Figure 2:
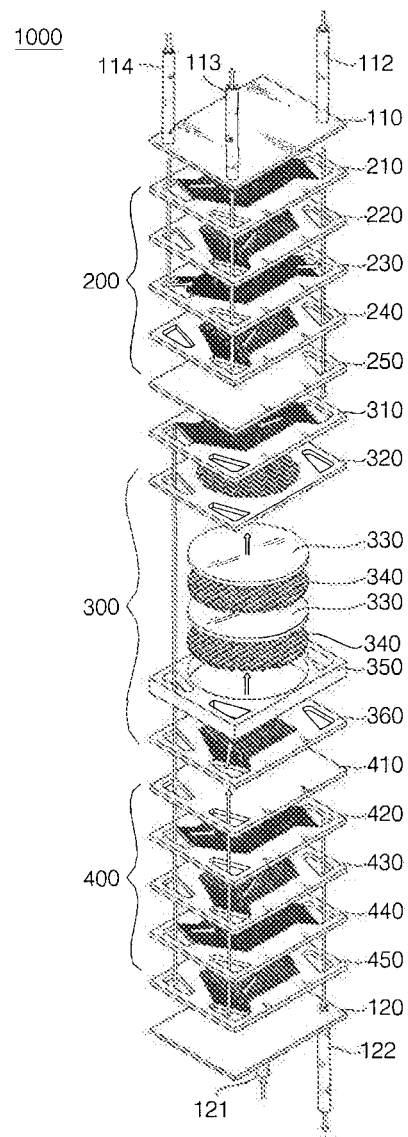
FIG. 2 is an exploded perspective view of a micro-channel WSG reaction device according to a first embodiment of the present invention.

As shown in FIG. 2, a micro-channel WSG reaction device 1000 using a feed-through metal catalyst according to a first embodiment of the present invention includes a plurality of laminated plates which are bonded by a method of diffusion bonding, electric welding, arc welding, or the like to make a compact shape as shown in FIG.

The micro-channel WSG reaction device 1000 includes an upper plate 110 and a lower plate 120 which are disposed at the uppermost side and the lowermost side thereof, respectively.

In addition, an upper heat transfer unit 200 which absorbs heat from a reaction gas by a thermal difference with a heat transfer gas, and a reaction unit 300 in which WGS reaction actively takes place, a lower heat transfer unit 400 which heats a reactant gas using the exhaust heat transfer gas to a temperature sufficient for the WSG reaction thereof to occur are disposed between the upper plate 110 and the lower plate 120.

Figure 17:
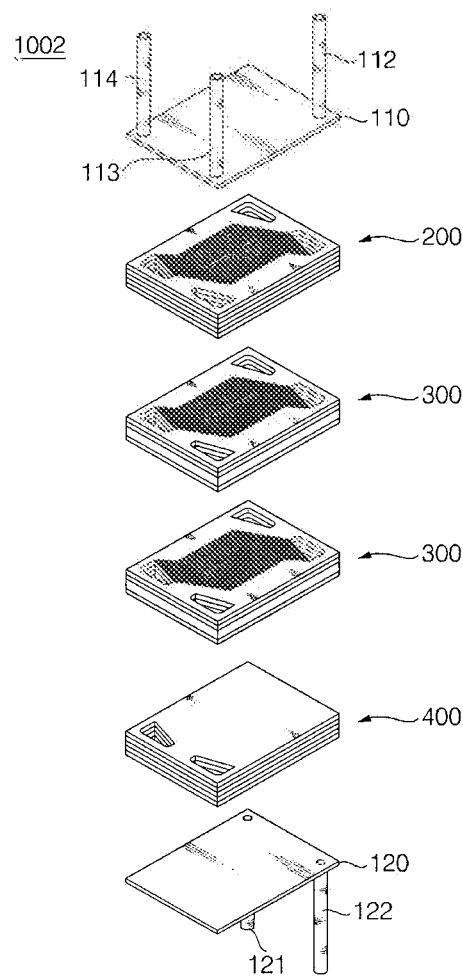
FIG. 17 is an exploded perspective view of another modified example of the micro-channel WSG reaction device of FIG. 2.
Figure 18:
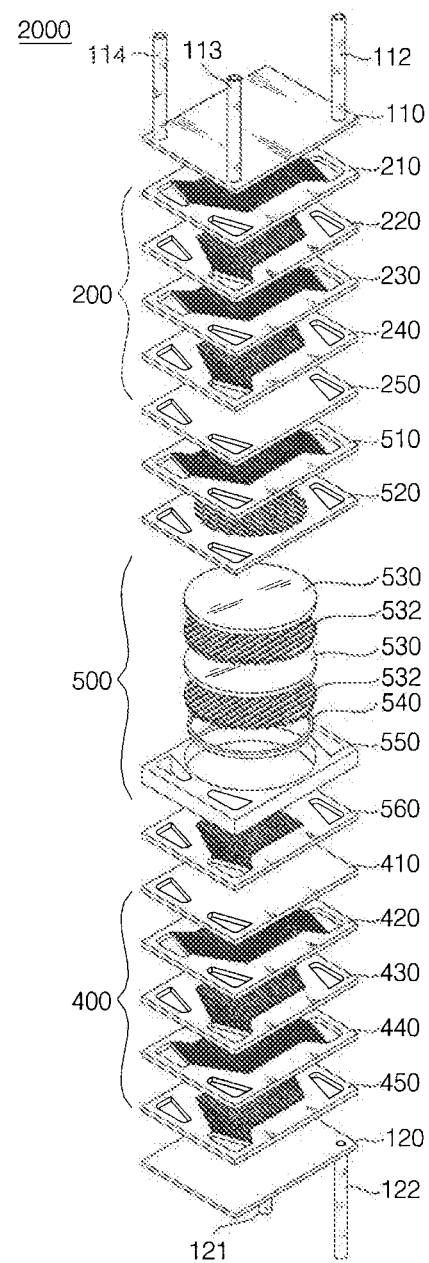
FIG. 18 is an exploded perspective view of a micro-channel WSG reaction device according to a second embodiment of the present invention.
Figure 19:
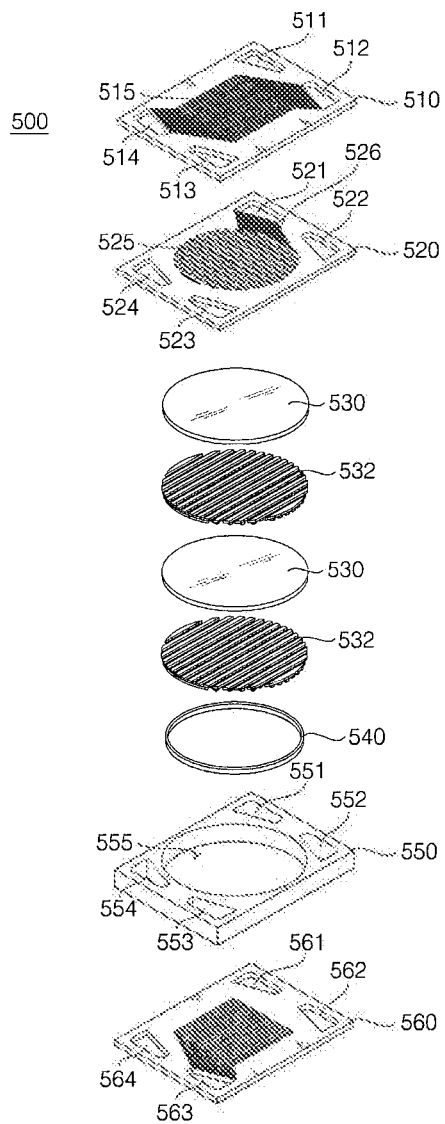
FIG. 19 is an exploded perspective view of a reaction unit of FIG. 18.
Figure 20:
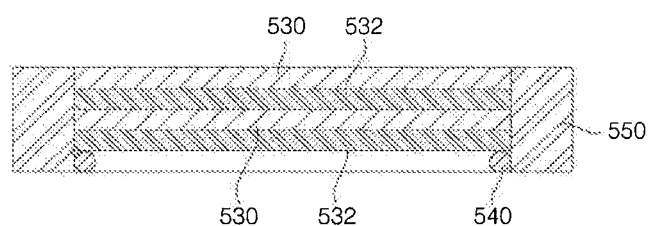
FIG. 20 is a cross-sectional view of a metal catalyst plate in which a metal catalyst and an o-ring are installed of FIG. 18.

In particular, as shown in FIG. 17, the present invention discloses a unique structure for stacking a plurality of the reaction units 300, which will be described below.

The upper plate 110 is provided with heat transfer gas supply pipes 112 and 114 which are connected with a heat transfer gas supply source (not shown) to supply the heat transfer gases in the device, and a product gas discharge pipe 113 for discharging the reaction gas out of the device. The heat transfer gas supply pipes 112 and 114 may be configured of two heat transfer gas supply pipes 112 and 114 through which the heat transfer gas and air are separately supplied, or may be a single heat transfer gas supply pipe by omitting any one of two.

Herein, the atmosphere or inert gases may be used as the heat transfer gas.

The lower plate 120 is provided with a reactant gas supply pipe 121 which is connected with a reactant gas supply source (not shown) to supply the reactant gas in the device, and the heat transfer gas discharge pipe 122 for discharging the heat transfer gas out of the device.

The upper heat transfer unit 200 disposed under the upper plate 110 includes an upper heat transfer gas flow path which is connected with the heat transfer gas supply pipes 112 and 114 to flow the heat transfer gas, and an upper product gas flow path which is formed in contact with the upper heat transfer gas flow path so as to allow heat transfer therebetween, and connected with the product gas discharge pipe 113.

The upper heat transfer unit 200 includes at least one upper heat transfer plates 210 and 230 which have upper heat transfer channels 215 and 235 communicated with the heat transfer gas supply pipes 112 and 114 to form the upper heat transfer gas flow path, and at least one upper reaction gas plates 220 and 240 which have upper reaction channels 225 and 245 communicated with the product gas discharge pipe 113 to form the upper product gas flow path, and are alternately laminated with the upper heat transfer plates 210 and 230. Further, an upper shielding plate 250 is disposed at the lowermost side of the upper heat transfer unit 200.

Figure 3:
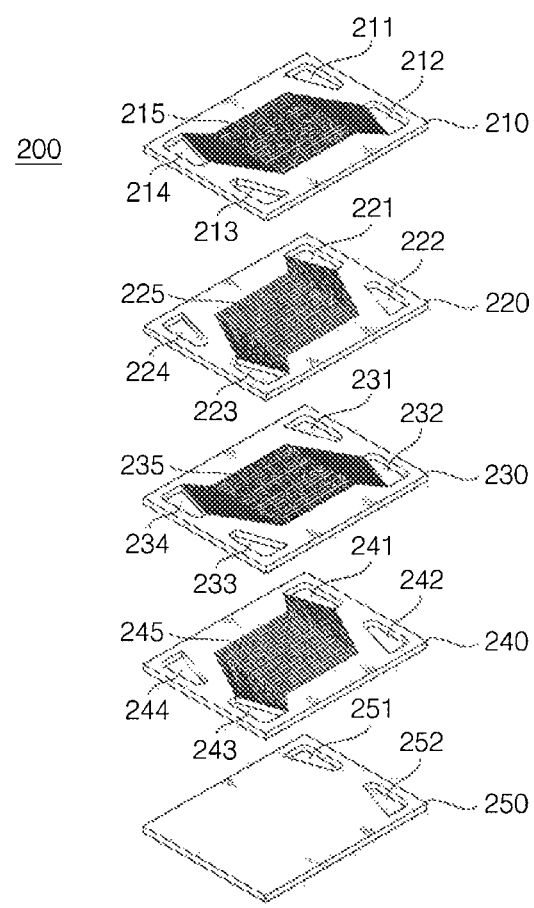
FIG. 3 is an exploded perspective view of an upper heat transfer unit of FIG. 1.

The upper heat transfer plates 210 and 230 and the upper reaction gas plates 220 and 240 include first to fourth upper through holes formed therein, as shown in FIG. 3. The first upper through holes 211, 221, 231 and 241, the second upper through holes 212, 222, 232 and 242, the third upper through holes 213, 223, 233 and 243, and the fourth upper through holes 214, 224, 234 and 244 are isolated from each other, and in the case that the micro-channel WSG reaction device 1000 has a rectangular cross section shape as shown in FIG. 2, it is preferable that these upper through holes be arranged near vertices of the rectangular structure in terms of heat transfer efficiency. Therefore, when the upper heat transfer plates 210 and 230 and the upper reaction gas plates 220 and 240 are laminated, the first to fourth upper through holes are arranged in the same position up and down to form a tube shape.

Accordingly, the upper heat transfer channels 215 and 235 are communicated with the second upper through holes 212 and 232 and the fourth upper through holes 214 and 234, while being isolated from first upper through holes 211 and 231 and the third upper through holes 213 and 233. In addition, the upper reaction channels 225 and 245 are communicated with the first upper through holes 221 and 241 and the third upper through holes 223 and 243, while being isolated from the second upper through holes 222 and 242 and the fourth upper through holes 224 and 244.

The upper shielding plate 250 only includes a first upper through hole 251 and a second upper through hole 252.

As a result, the upper heat transfer gas flow path is formed by the heat transfer gas supply pipes 112 and 114, the second upper through holes 212, 222, 232 and 242, the fourth upper through holes 214, 224, 234 and 244, the upper heat transfer channels 215 and 235, and the second upper through hole 252 of the upper shielding plate 250. In addition, the upper product gas flow path is formed by the product gas discharge pipe 113, the first upper through holes 211, 221, 231 and 241, the third upper through holes 213, 223, 233 and 243, the upper reaction channels 225 and 245, and the first upper through hole 251 of the upper shielding plate 250.

The lower heat transfer unit 400 disposed on the lower plate 120 includes a lower heat transfer gas flow path which is connected with the heat transfer gas discharge pipe 122 to flow the heat transfer gas, and a lower reactant gas flow path which is formed in contact with the lower heat transfer gas flow path so as to allow heat transfer therebetween, and connected with the reactant gas supply pipe 121.

The lower heat transfer unit 400 includes at least one lower heat transfer plates 420 and 440 which have lower heat transfer channels 425 and 445 communicated with the heat transfer gas discharge pipe 122 to form the lower heat transfer gas flow path, and at least one lower reactant gas plates 430 and 450 which have lower reaction channels 435 and 455 communicated with the reactant gas supply pipe 121 to form the lower reactant gas flow path, and are alternately laminated with the lower heat transfer plate 420 and 440. Further, a lower shielding plate 410 is disposed at the uppermost side of the lower heat transfer unit 400.

Figure 6:
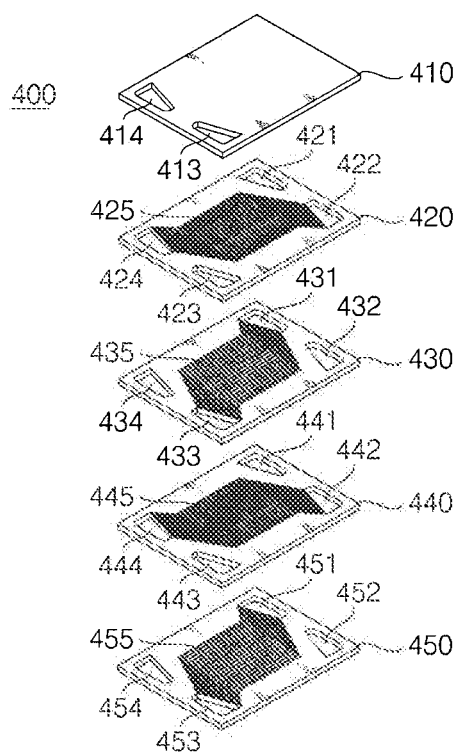
FIG. 6 is an exploded perspective view of a lower heat transfer unit of FIG. 2.

The lower heat transfer plates 420 and 440 and the lower reactant gas plates 430 and 450 include first to fourth lower through holes formed therein, as shown in FIG. 6. The first lower through holes 421, 431, 441 and 451, the second lower through holes 422, 432, 442 and 452, the third lower through holes 423, 433, 443 and 453, and the fourth lower through holes 424, 434, 444 and 454 are isolated from each other, and in the case that the micro-channel WSG reaction device 1000 has a rectangular cross section shape as shown in FIG. 6, it is preferable that these lower through holes be arranged near vertices of the rectangular structure in terms of heat transfer efficiency. Therefore, when the lower heat transfer plates 420 and 440 and the lower reactant gas plates 430 and 450 are laminated, the first to fourth lower through holes are arranged in the same position up and down to form a tube shape.

Accordingly, the lower heat transfer channels 425 and 445 are communicated with the second lower through holes 422 and 442 and the fourth lower through holes 424 and 444, while, being isolated from the first lower through holes 421 and 441 and the third lower through holes 423 and 443. In addition, the lower reaction channels 435 and 455 are communicated with the first lower through holes 431 and 451 and the third lower through holes 433 and 453, while being isolated from the second lower through holes 432 and 452 and the fourth lower through holes 434 and 454.

The lower shielding plate 410 only includes a third lower through hole 413 and a fourth lower through hole 414.

As a result, the lower heat transfer gas flow path is formed by the heat transfer gas discharge pipe 122, the second lower through holes 422, 432, 442 and 452, the fourth lower through holes 424, 434, 444 and 454, the lower heat transfer channels 215 and 235, and the fourth lower through hole 414 of the lower shielding plate 410. In addition, the lower reactant gas flow path is formed by the reactant gas supply pipe 121, the first lower through holes 421, 431, 441 and 451, the third lower through holes 423, 433, 443 and 453, the lower reaction channels 435 and 455, and the third lower through hole 413 of the lower shielding plate 410.

Figure 4:
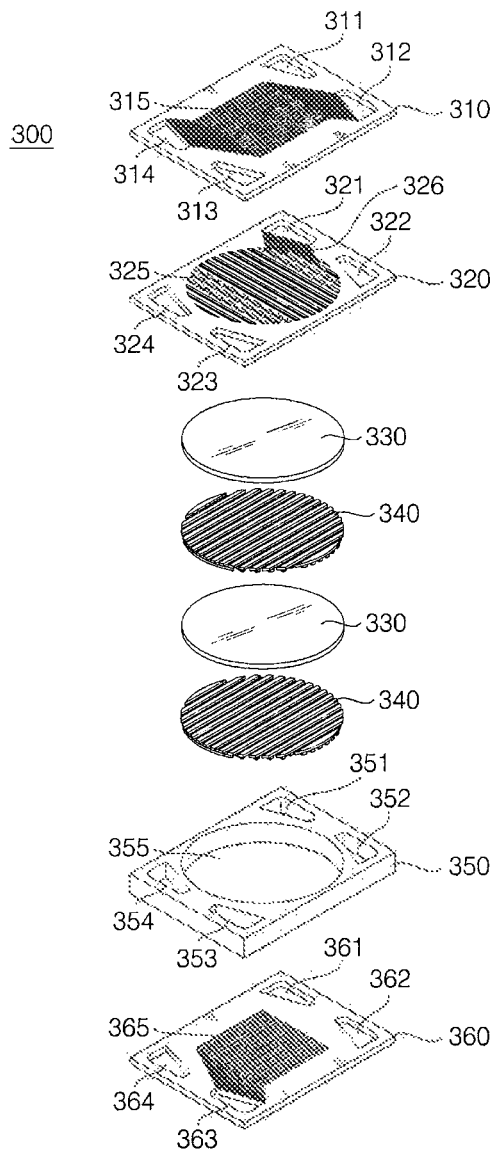
FIG. 4 is an exploded perspective view of a reaction unit of FIG. 2.
Figure 5:
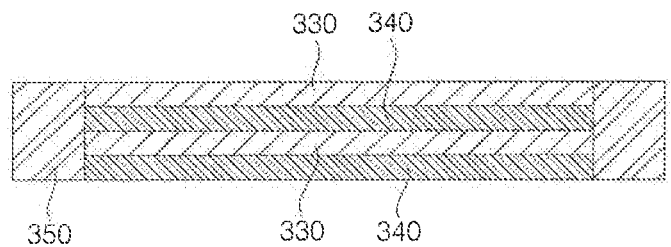
FIG. 5 is a cross-sectional view of a WSG reaction plate in which a metal catalyst and a metal retainer are installed of FIG. 2.

The reaction unit 300 has a structure that can be laminated in two or more layers, as shown in FIG. 4. For this, the reaction unit 300 includes a gas supply plate 360 on which a gas supply channel 365 for communicating only with the lower reactant gas flow path is installed, a metal catalyst plate 350 which is laminated on the gas supply plate 360 and has a metal catalyst 330 mounted thereon, a gas transfer unit which is laminated on the metal catalyst plate 350 to transfer the reaction gas after completion of the WGS reaction with the metal catalyst 330 to the upper product gas flow path, and an endothermic plate 310 which is disposed under the gas supply plate 360 or on the lower gas transfer unit and has an endothermic channel 315 for communicating the upper heat transfer gas flow path with the lower heat transfer gas flow path.

The gas supply plate 360, the metal catalyst plate 350, the gas transfer unit, and the endothermic plate 310 include first reaction through holes 311, 321, 351 and 361 communicated with the upper product gas flow path, second reaction through holes 312, 322, 352 and 362 communicated with the upper heat transfer gas flow path, third reaction through holes 313, 323, 353 and 363 communicated with the lower reactant gas flow path, fourth reaction through holes 314, 324, 354 and 364 communicated with the lower heat transfer gas flow path, respectively. As a result, when bonding the reaction unit 300, the first to fourth reaction through holes are disposed at the same position up and down to form a tube shape.

Accordingly, all of the first to fourth reaction through holes, the first to fourth upper through holes, and the first to fourth lower through holes may be disposed at the same position.

In the endothermic plate 310, the endothermic channel 315 is communicated with the second reaction through hole 312 and the fourth reaction through holes 314, while being isolated from the first reaction through hole 311 and the third reaction through holes 313.

In the gas supply plate 360, the gas supply channel 365 is communicated only with the third reaction through hole 363, and isolated from the first reaction through hole 361, the second reaction through hole 362, and the fourth reaction through hole 364.

Figure 12:
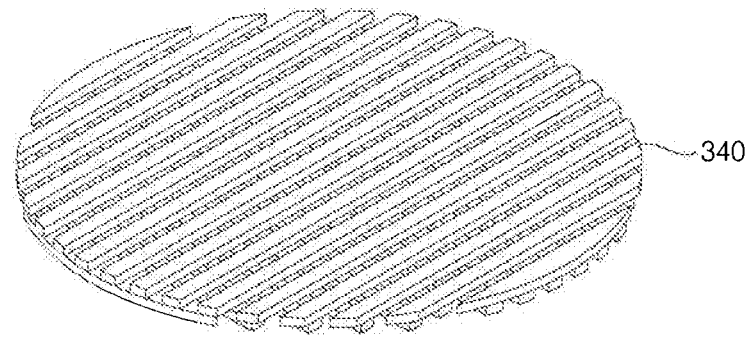
FIG. 12 is a perspective view of the metal retainer of the micro-channel WSG reaction device of FIG. 2.
Figure 13:
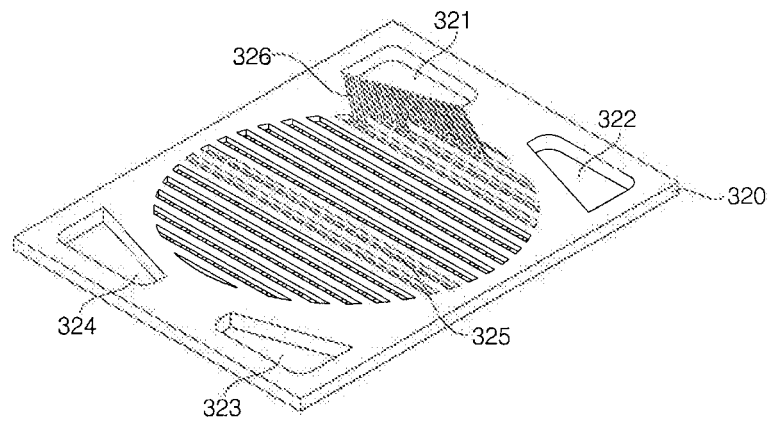
FIG. 13 is a perspective view of a collection and transfer plate of the micro-channel WSG reaction device of FIG. 2.
Figure 14:
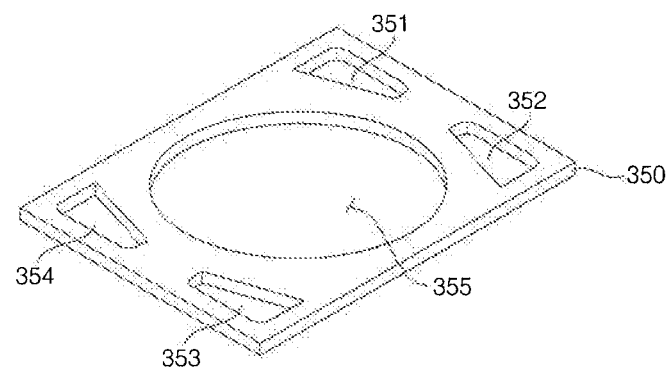
FIG. 14 is a perspective view of the metal catalyst plate of the micro-channel WSG reaction device of FIG. 2.
Figure 15:
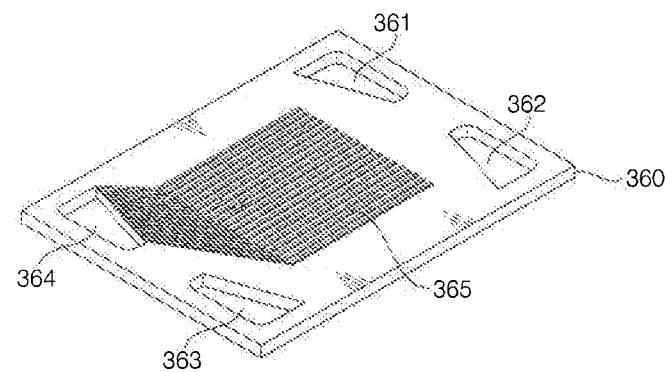
FIG. 15 is a perspective view of a gas supply plate of the micro-channel WSG reaction device of FIG. 2.

In addition, a porous metal retainer 340 is disposed in a catalyst hole 355 formed in the center of the metal catalyst plate 350 under the metal catalyst 330. The metal retainer 340 may be formed so as to have a structure in which an upper grill and a lower grill are vertically intersected with each other, as shown in FIG. 12. This metal retainer 340 may be fabricated by adhering masks on top and bottom of a metal disc and etching the same. Preferably, the metal retainer 340 and the metal catalyst 330 protrude from the metal catalyst plate 350 before bonding, and have the same height with the upper surface of the metal catalyst plate 350 by pressing with a compression force during bonding, thereby improving the contact efficiency of the metal catalyst 330.

Figure 23:
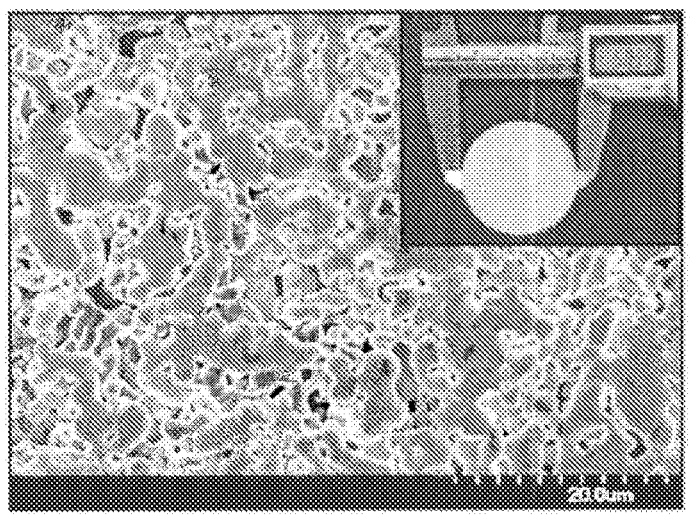
FIG. 23 is an enlarged photograph of a porous metal catalyst used in the micro-channel WSG reaction device of FIG. 22.

It is possible to use the metal catalyst 330 with a thickness of 0.3 to 3.0 mm which is molded by pressing nickel powder (average particle diameter of 2.0 μm) at 100 to 800 kgf/cm². The molded body is sintered at 500 to 900° C. for 1 to 5 hours under an atmosphere of hydrogen gas to provide a desired strength. Preferably, the metal catalyst 330 has a porous structure, as shown in FIG. 23.

Figure 16:
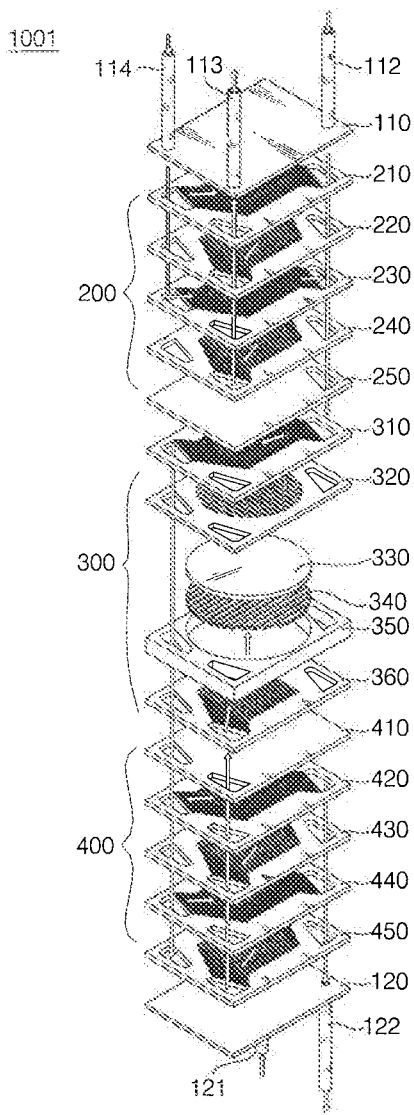
FIG. 16 is an exploded perspective view of a modified example of the micro-channel WSG reaction device of FIG. 2.

Further, a plurality of metal catalysts 330 and a plurality of the metal retainers 340 are laminated alternately to each other depending on the flow rate of the inflowing synthesis gas and the concentration of CO, as shown in FIGS. 2 and 4. That is, the metal retainer 340 is positioned on the lowermost side and the metal catalyst 330 is positioned on the uppermost side thereof. It is possible to decrease the contention of CO in the gas after completion of WGS reaction to 1% or less by alternately laminating the metal catalyst 330 and the metal retainer 340. In addition, the thickness of the metal catalyst plate 350 increases in proportion to the number of the laminated metal catalyst 330 and metal retainer 340. For configuration of the metal catalyst 330 and the metal retainer 340, only one metal catalyst 330 and one metal retainer 340 may be used, as shown in FIG. 16.

That is, the number of the Laminated metal catalyst 330 and metal retainer 340 may vary depending on the heat transfer amount necessary for reaction, flow rate, pressure, and composition of the reactant gas or the like.

In addition, the gas transfer unit includes a gas collection and transfer plate 320 which is disposed on the metal catalyst plate 350 and has porous collection holes 325 isolated from the second to fourth reaction through holes 322, 323 and 324. The porous collection holes 325 are communicated with the first reaction through hole 321 through a connecting channel 326. As described above, the porous collection holes 325 and the connecting channel 326 may be fabricated by partial etching using a mask.

It is preferable that the cross-sectional area of the porous collection holes 325 be formed smaller than that of the metal catalyst 330, thereby preventing reaction gas which is not passed through the metal catalyst 330 from being flowed out.

Figure 7:
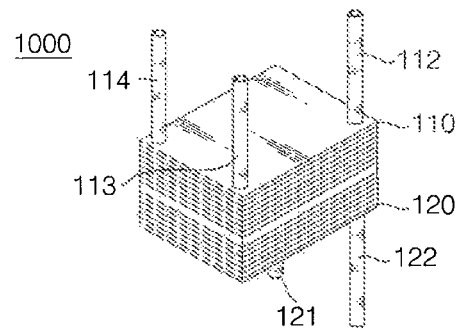
FIG. 7 is a perspective view illustrating an appearance of the micro-channel WSG reaction device of FIG. 2 after bonding.
Figure 8:
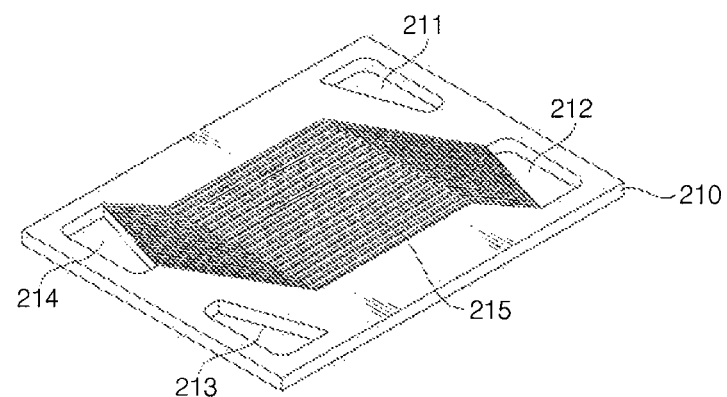
FIG. 8 is a perspective view of an upper heat transfer plate of the micro-channel WSG reaction device of FIG.
Figure 9:
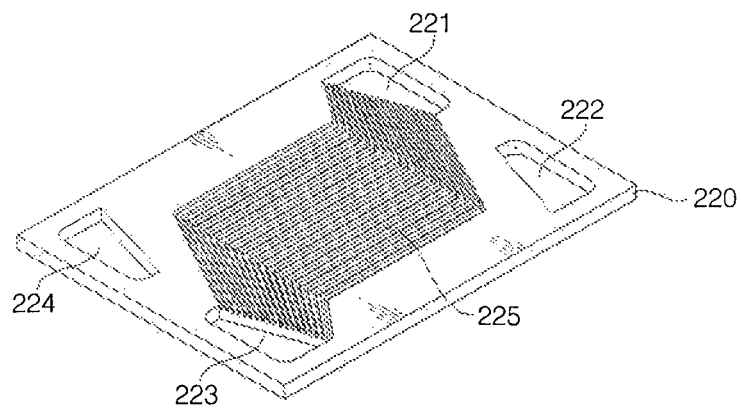
FIG. 9 is a perspective view of an upper reaction gas plate of the micro-channel WSG reaction device of FIG. 2.
Figure 11:
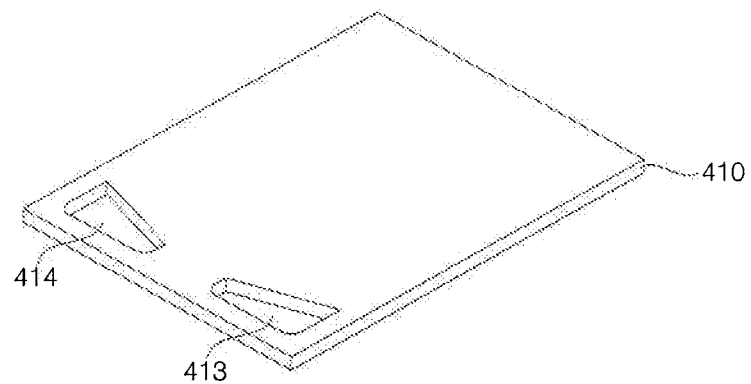
FIG. 11 is a perspective view of a lower shielding plate of the micro-channel WSG reaction device of FIG. 2.
Figure 22:
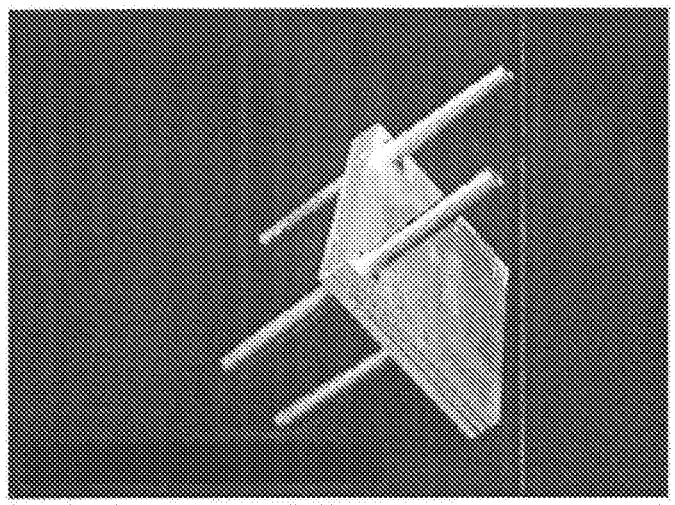
FIG. 22 is a photograph of a product in which the micro-channel WSG reaction device of FIG. 2 is bonded.

The micro-channel WSG reaction device 1000 according to the first embodiment of the present invention is configured basically as described above. The micro-channel WSG reaction device 1000 having the above configuration may have the shape shown in FIG. 7 by bonding. In addition, FIG. 22 shows a photograph of the practically manufactured micro-channel WSG reaction device 1000.

FIG. 17 shows a micro-channel WSG reaction device 1002 which is a modified example of the micro-channel WSG reaction device 1000 according to the first embodiment of the present invention and has a plurality of reaction units 300.

As described above, when bonding the reaction unit 300, the first to fourth reaction through holes are disposed at the same position up and down to form a tube shape in the reaction unit 300. Accordingly, even if the reaction units 300 are laminated, it is possible to form a continuously connected tube shape. Finally, since the heat transfer gas flows only through the endothermic plate 310 due to the upper shielding plate 250 of the upper heat transfer unit 200 disposed on an upper side of the plurality of reaction units 300 and the lower shielding plate 410 of the lower heat transfer unit 400 disposed on a lower side of the plurality of reaction units 300, and the reaction gas flows only through the metal catalyst 330, it is possible to laminate the reaction units 300.

Accordingly, even if the endothermic plate 310 is disposed at any one of the lower side of the gas supply plate 360 or the upper side of the collection and transfer plate 320, an identical effect is obtained by continuously laminating the reaction units 300.

FIGS. 18 to 21 show a micro-channel WSG reaction device 2000 according to a second embodiment of the present invention. The configuration parts corresponding to the micro-channel WSG reaction device 1000 of the first embodiment have the same reference numbers, and a detailed description thereof will be omitted.

The micro-channel WSG reaction device 2000 of the second embodiment is different from the micro-channel WSG reaction device 1000 of the first embodiment in terms of installation form of a metal catalyst 530. That is, in the micro-channel WSG reaction device 2000 of the second embodiment, an O-ring 540 is disposed under the metal catalyst 530 to provide a pressing force for sealing the reactant gas and closely contacting the metal catalyst 530 to the lower side of a collection and transfer plate 520. The O-ring 540 is made of metallic material, and is pressed and deformed in an assembly stage of the device to closely contact an inner wall of a catalyst hole 555 formed in a metal catalyst plate 550 mounted on a gas supply plate 560, thereby preventing the reaction gas from being leaked between the metal catalyst 530 and the collection and transfer plate 520. The cross-sectional shape of the O-ring 540 is not limited, but may be formed in a circle in the second embodiment of the present invention. Accordingly, the sum of the thickness of the O-ring 540 and the metal catalyst 530 are larger than the thickness of the catalyst hole 555 before assembly, an become the same as the thickness of the catalyst hole 555 during assembling, thus it is possible to provide a sufficient tightness due to the O-ring 540.

Figure 21:
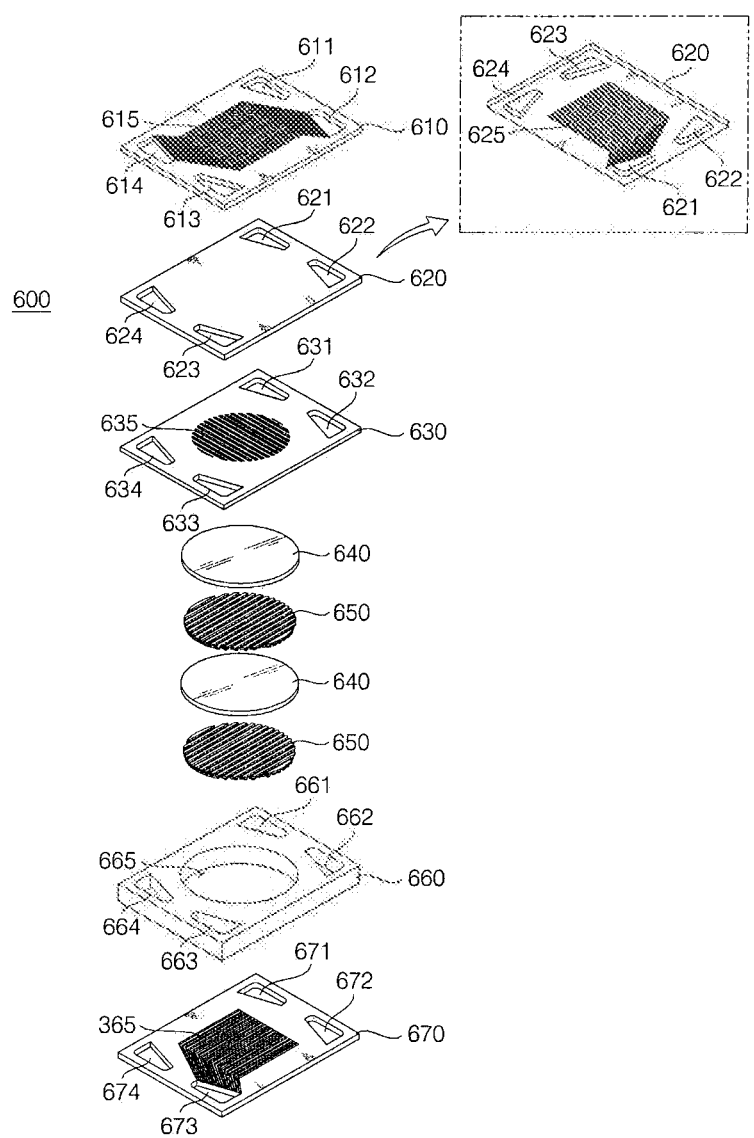
FIG. 21 is an exploded perspective view of a modified example of the reaction unit shown in FIG. 4.

FIG. 21 shows a reaction unit 600 which is a modified example of the reaction unit 300 in the micro-channel WSG reaction device 1000 according to the first embodiment of the present invention. The configuration parts corresponding to the micro-channel WSG reaction device 1000 of the first embodiment have the same reference numbers, and a detailed description thereof will be omitted.

The reaction unit 600 includes a gas collection plate 630 for providing a gas collecting function to the gas transfer unit, and a gas transfer plate 620 having a gas transferring function. These are two separated functions of the collection and transfer plate 320 of the first embodiment.

The gas collection plate 630 includes porous collection holes 635 which are formed in the center portion thereof, and isolated from first to fourth reaction through holes 631, 632, 633 and 634. In addition, the gas transfer plate 620 has an inverted shape of a gas supply plate 670 and includes a gas transfer channel 625 formed thereon. The gas transfer channel 625 is communicated only with the first reaction through hole 621, while being isolated from the second to fourth reaction through holes 622, 623 and 624. The gas transfer channel 625 has a function of collecting the reaction gas supplied from the porous collection holes 635 and transferring the collected reaction gas to the first reaction through hole 621.

Next, an experimental example for measuring the performance of the micro-channel WSG reaction device 1000 will be described.

To facilitate the reaction, the metal catalyst 330 is activated under the hydrogen gas for 30 minutes at 450° C. before reaction. A gas having a composition of 60% CO, 36% $H_2$, and 4% Ar (a ratio of stream/C: 3.0) was used as the reaction.

Figure 24:
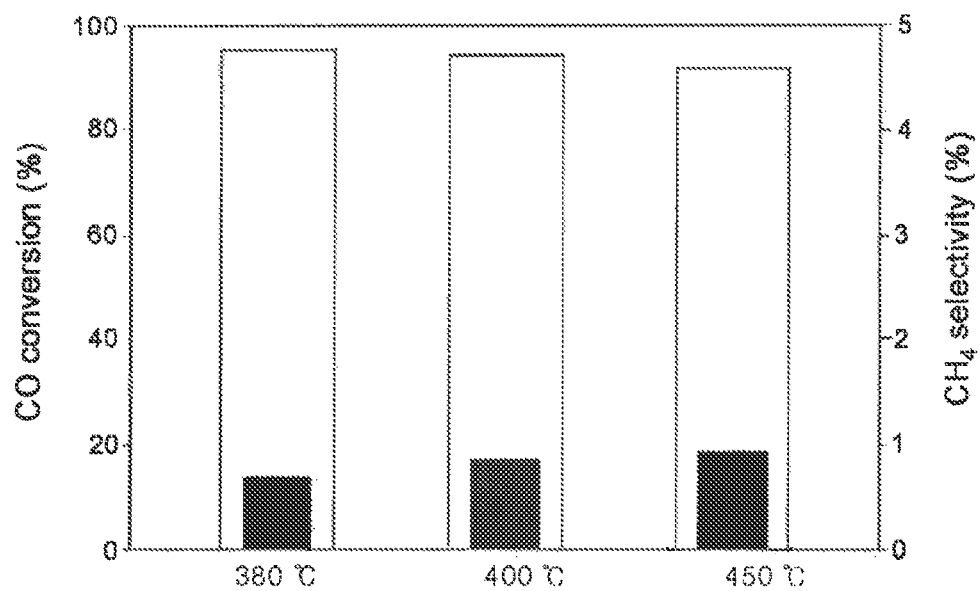
FIG. 24 is a graph illustrating experimental examples using the micro-channel WSG reaction device according to the first embodiment of the present invention.

Gas hourly space velocity (GHSV) of 20000 $h^{-1}$ at normal atmospheric pressure was set as an experimental condition. The experimental results are shown in FIG. 24. In the graph of FIG. 24, a bright gray bar represents the CO conversion rate, and dark gray bar represents the methane ($CH_4$) selectivity.

The equilibrium conversion rate is 95.2%, 94.2%, and 91.4% at 380° C., 400° C., and 450° C., respectively, while all methane selectivity is relatively small less than 1%.

It is confirmed that the reaction heat generated during the reaction can effectively removed by using the micro-channel WSG reaction device 1000 according to the first embodiment of the present invention, and as a result the CO conversion rate at each temperature can be reached to the equilibrium conversion rate of WGS reaction.

Although the present invention has been described in connection with the exemplary embodiments illustrated in the drawings, it is only illustrative. It will be understood by those skilled in the art that various modifications and equivalents can be made to the present invention. Therefore, the true technical scope of the present invention should be defined by the appended claims.

DESCRIPTION OF REFERENCE NUMERALS IN DRAWINGS

10: gasification reactor, 20 desulfurization device
30: high-temperature water gas transition reactor,
40 low-temperature water gas transition reactor
50: hydrogen/carbon dioxide separation plate
110: upper plate, 112, 114: heat transfer gas supply pipe
113: product gas discharge pipe, 120: lower plate
121: reactant gas supply pipe, 122: heat transfer gas discharge pipe
200: upper heat transfer unit, 210, 230: upper heat transfer plate
211, 221, 231, 241: first upper through hole, 212, 222, 232, 242: second upper through hole
213, 223, 233, 243: third upper through hole, 214, 224, 234, 244: fourth upper through hole
215, 235: upper heat transfer channel, 220, 240: upper reaction gas plate 225, 245: upper reaction channel, 250: upper shielding plate
300, 500, 600: reaction unit, 310, 510, 610: endothermic plate
311, 321, 351, 361, 511, 521, 551, 561, 611, 621, 631, 661, 671: first reaction through hole
312, 322, 352, 362, 512, 522, 552, 562, 612, 622, 632, 662, 672: second reaction through hole
313, 323, 353, 363, 513, 523, 553, 563, 613, 623, 633, 663, 673: third reaction through hole
314, 324, 354, 364, 514, 524, 554, 564, 614, 624, 634, 664, 674: fourth reaction through hole
315, 515, 615 endothermic channel, 320, 520: collection and transfer plate
325, 525, 635: porous collecting holes, 326, 526: connecting channel
330, 530, 640: metal catalyst, 340, 532, 650: metal retainer
350, 550, 660: metal catalyst plate, 355, 555, 665: catalyst hole
360, 560, 670: gas supply plate, 365, 565: gas supply channel
400: lower heat transfer unit, 410: lower shielding plate
420, 440: lower heat transfer plate, 421, 431, 441, 451 first lower through hole
422, 432, 442, 452: second lower through hole, 423, 433, 443, 453: third lower through hole
424, 434, 444, 454: fourth lower through hole, 425, 445 lower heat transfer channel
430, 450 lower reactant gas plate, 435, 455: lower reaction channel
540: O-ring, 625: gas transfer channel
1000, 1001, 1002, 2000: micro-channel WSG reaction device

The invention claimed is:

1. A micro-channel water-gas shift (WGS) reaction device comprising:
    an upper plate including a heat transfer gas supply pipe which is connected with a heat transfer gas supply source to supply a heat transfer gas, and a product gas discharge pipe for discharging a product gas;
    a lower plate including a reactant gas supply pipe which is connected with a reactant gas supply source to supply a reactant gas, and a heat transfer gas discharge pipe the discharging the heat transfer gas;
    an upper heat transfer unit which is disposed under the upper plate and includes an upper heat transfer gas flow path which is connected with the heat transfer gas supply pipe to flow the heat transfer gas, and an upper product gas flow path which is formed in contact with the upper heat transfer gas flow path so as to allow heat transfer therebetween, and connected with the product gas discharge pipe;
    a lower heat transfer unit which is disposed on the lower plate and includes a lower heat transfer gas flow path which is connected with the heat transfer gas discharge pipe to flow the heat transfer gas, and a lower reactant gas flow path which is formed in contact with the lower heat transfer gas flow path so as to allow heat transfer therebetween, and connected with the product gas supply pipe; and
    at least one reaction unit laminated between the upper heat transfer unit and the lower heat transfer unit,
    wherein the at least one reaction unit, in order to be laminated in one or more layers, includes:
    a gas supply plate on which a gas supply channel for communicating only with the lower reactant gas flow path is installed;
    a metal catalyst plate which is laminated on the gas supply plate and has at least one metal catalyst mounted thereon and at least one porous metal retainer disposed under the metal catalyst;
    a gas transfer unit which is laminated on the metal catalyst plate to transfer the reactant gas reacted with the metal catalyst to the upper product gas flow path; and
    an endothermic plate which is disposed under the gas supply plate or the upper gas transfer unit and has an endothermic channel for communicating the upper heat transfer gas flow path with the lower heat transfer gas flow path, and
    wherein the gas supply plate, the metal catalyst plate, the gas transfer unit, and the endothermic plate include first reaction through holes communicated with the upper product gas flow path, second reaction through holes communicated with the upper heat transfer gas flow path, third reaction through holes communicated with the lower reactant gas flow path, fourth reaction through holes communicated with the lower heat transfer gas flow path, respectively.

2. The device according to claim 1, wherein, when the metal catalyst plate includes a plurality of metal catalysts and a plurality of the metal retainer, these metal catalysts and metal retainers are laminated alternately to each other.

3. The device according to claim 1, wherein the upper heat transfer unit comprises:
    at least one upper heat transfer plate which has an upper heat transfer channel communicated with the heat transfer gas supply pipe to form the upper heat transfer gas flow path;
    at least one upper reaction gas plate which has an upper reaction channel communicated with the product gas discharge pipe to form the upper product gas flow path, and are alternately laminated with the at least one upper heat transfer plate,
    wherein the at least one upper heat transfer plate and the at least one upper reaction gas plate include first upper through holes formed at a position corresponding to the first reaction through holes to fourth reaction through holes of the reaction unit, and
    an upper shielding plate having the first upper through holes and second upper through holes formed therein is disposed at the lowermost side of the upper heat transfer unit.

4. The device according to claim 1, wherein the lower heat transfer unit comprises:
    at least one lower heat transfer plate which has a lower heat transfer channel communicated with the heat transfer gas supply pipe to form the lower heat transfer gas flow path; and
    at least one lower reactant gas plate which has a lower reaction channel communicated with the reactant gas supply pipe to form the lower reactant gas flow path, and are alternately laminated with the lower heat transfer plate,
    wherein the at least one lower heat transfer plate and the at least one lower reactant gas plate include first lower through holes to fourth lower through holes formed at a position corresponding to the first reaction through holes to fourth reaction through holes of the reaction unit, and
    a lower shielding plate having the third lower through holes and fourth lower through holes formed therein is disposed at the uppermost side of the lower heat transfer unit.

5. The device according to claim 1, wherein the gas transfer unit comprises:

a gas collection plate which is disposed on the metal catalyst plate, and isolated from the first reaction through holes to fourth reaction through holes; and a gas transfer plate which is disposed on the gas collection plate, and includes a gas transfer channel communicated only with the first reaction through hole.

6. The device according to claim 1, wherein the gas transfer trait is a collection and transfer plate which is disposed on the metal catalyst plate, and has porous collection holes isolated from the second reaction through holes to fourth reaction through holes, wherein the porous collection holes are communicated with the first reaction hole through a connecting channel.

7. The device according to claim 1, wherein an O-ring is disposed on a lower side of the metal catalyst plate, and the at least one metal retainer is disposed on the O-ring.

8. The device according to claim 6, wherein a cross-sectional area of the porous collection holes are formed smaller than that of the metal catalyst.

* * * * *